(12) United States Patent
Liljedahl

(10) Patent No.: US 11,853,755 B2
(45) Date of Patent: Dec. 26, 2023

(54) ATOMIC RANGE COMPARE AND MODIFY OPERATIONS

(71) Applicant: ARM LIMITED, Cambridge (GB)

(72) Inventor: Eric Ola Harald Liljedahl, Lund (SE)

(73) Assignee: Arm Limited, Cambridge (GB)

( * ) Notice: Subject to any disclaimer, the term of this patent is extended or adjusted under 35 U.S.C. 154(b) by 83 days.

(21) Appl. No.: 17/754,189

(22) PCT Filed: Jul. 30, 2020

(86) PCT No.: PCT/GB2020/051834
§ 371 (c)(1),
(2) Date: Mar. 25, 2022

(87) PCT Pub. No.: WO2021/064342
PCT Pub. Date: Apr. 8, 2021

(65) Prior Publication Data
US 2022/0300282 A1    Sep. 22, 2022

(30) Foreign Application Priority Data

Sep. 30, 2019   (GB) ...................................... 1914093

(51) Int. Cl.
*G06F 9/30*       (2018.01)
*G06F 9/52*       (2006.01)

(52) U.S. Cl.
CPC ........ *G06F 9/30021* (2013.01); *G06F 9/3001* (2013.01); *G06F 9/30145* (2013.01); *G06F 9/526* (2013.01)

(58) Field of Classification Search
CPC ............... G06F 9/30021; G06F 9/3001; G06F 9/30145; G06F 9/526
See application file for complete search history.

(56) References Cited

U.S. PATENT DOCUMENTS

| | | | |
|---|---|---|---|
| 6,816,960 B2* | 11/2004 | Koyanagi | G06F 9/30043 712/216 |
| 9,442,836 B2* | 9/2016 | Yamamura | G06F 12/1027 |
| 9,678,899 B2* | 6/2017 | Humphries | G06F 12/1441 |
| 11,422,808 B2* | 8/2022 | Horsnell | G06F 9/30094 |
| 11,720,356 B2* | 8/2023 | Grocutt | G06F 9/355 712/208 |

(Continued)

*Primary Examiner* — Cheng Yuan Tseng
(74) *Attorney, Agent, or Firm* — NIXON & VANDERHYE P.C.

(57) ABSTRACT

Apparatuses, methods of data processing, complementary instructions and programs related to atomic range-compare-and-modify operations are disclosed. Data processing operations are performed in response to received instructions, wherein the data processing operations comprise an atomic range-compare-and-modify operation, which receives indications of a data value storage location, a range start, and a range size and, as an atomic set of steps, reads a base value stored at the data value storage location, determines an in-range condition to be true when the base value is within a request range having a lower bound being the range start and an upper bound being the range start plus the range size, and when the in-range condition is true, modify the base value to an updated base value. Reduced contention between processes accessing the same data value storage location and range of locations is thus supported.

19 Claims, 12 Drawing Sheets

(56) References Cited

U.S. PATENT DOCUMENTS

| | | | |
|---|---|---|---|
| 2013/0080737 A1* | 3/2013 | Reid | G06F 9/30087 |
| | | | 712/201 |
| 2013/0246753 A1 | 9/2013 | Bradbury et al. | |
| 2016/0283237 A1 | 9/2016 | Pardo et al. | |
| 2022/0300282 A1* | 9/2022 | Liljedahl | G06F 9/3001 |

* cited by examiner

ATOMIC RANGE COMPARE AND MODIFY OPERATIONS

The present techniques relate to data processing. In particular the present techniques relate to operations in a data processing apparatus which atomically compare the value expected to be found at a write location with a value to be written at that location where the success of the operation is dependent on the outcome of that comparison.

There are various data processing contexts in which it may be required for the modification of a value at a particular stored location to be made contingent on a specified expected value to be found at that location, where the entire operation must be performed atomically. In other words the comparison with the value already stored at the specified location (necessitating a read operation) and the write operation to modify that value must be performed immediately sequentially and without any other operation intervening (which might modify the value). Such an operation may for example be carried out in situations where there is the possibility for contention between concurrent updates on the same location, but where it is important that the concurrency of these updates do not cause errors or inconsistencies to arise. One example context in which such an operation may be used is in the administration of data items held in the queue of a ring buffer, where multiple processing elements concurrently seek to modify the content of the ring buffer. In particular for example when multiple "consumers" seek to dequeue elements concurrently from the ring buffer this can result in concurrent access to a shared head pointer (which indicates the oldest data item in the queue, which should be the first to be dequeued if the dequeuing is to take place in-order). However, the concurrent access to this head pointer can mean that the above-mentioned operation such as an atomic compare-and-swap (CAS) operation, which is contingent on an expected (previously read) value of the head pointer to be found in order to allow its update to the head pointer value to be carried out, can result in difficulties for scalability, i.e. for many consumers concurrently seeking to dequeue elements from the ring buffer.

At least some examples disclosed herein provide an apparatus comprising: data processing circuitry to perform data processing operations in response to received instructions, wherein the data processing operations comprise an atomic range-compare-and-modify operation, wherein the atomic range-compare-and-modify operation is arranged to: receive indications of a data value storage location, a range start, and a range size; and as an atomic set of steps to: read a base value stored at the data value storage location; determine an in-range condition to be true when the base value is within a request range having a lower bound being the range start and an upper bound being the range start plus the range size; and when the in-range condition is true, modify the base value to an updated base value.

At least some examples disclosed herein provide a data processing method comprising: performing data processing operations in response to received instructions, wherein the data processing operations comprise an atomic range-compare-and-modify operation, wherein the atomic range-compare-and-modify operation is arranged to: receive indications of a data value storage location, a range start, and a range size; and as an atomic set of steps to: read a base value stored at the data value storage location; determine an in-range condition to be true when the base value is within a request range having a lower-bound being the range start and an upper-bound being the range start plus the range size; and when the in-range condition is true, to modify the base value to an updated base value.

At least some examples disclosed herein provide a data processing apparatus comprising: instruction decoder circuitry to decode instructions and to generate control signals dependent on the instructions; and data processing circuitry to perform data processing operations in response to the control signals, wherein the instruction decoder circuitry is responsive to an atomic range-compare-and-modify instruction providing indications of a data value storage location, a range start, and a range size to generate the control signals such that the data processing circuitry performs an atomic range-compare-and-modify operation comprising, as an atomic set of steps: reading a base value stored at the data value storage location; determining an in-range condition to be true when the base value is within an request range having a lower-bound being the range start and an upper-bound being the range start plus the range size; and when the in-range condition is true, modifying the base value to an updated base value.

At least some examples disclosed herein provide a method of data processing comprising: decoding instructions and generating control signals dependent on the instructions; and performing data processing operations in response to the control signals, wherein the decoding instructions comprises, in responsive to an atomic range-compare-and-modify instruction providing indications of a data value storage location, a range start, and a range size generating the control signals such that the data processing circuitry performs an atomic range-compare-and-modify operation comprising, as an atomic set of steps: reading a base value stored at the data value storage location; determining an in-range condition to be true when the base value is within an request range having a lower-bound being the range start and an upper-bound being the range start plus the range size; and when the in-range condition is true, modifying the base value to an updated base value.

At least some examples disclosed herein provide a computer program for controlling a host data processing apparatus to provide an instruction execution environment comprising: instruction decoder logic to decode instructions and to generate control signals dependent on the instructions; and data processing logic to perform data processing operations in response to the control signals, wherein the instruction decoder logic is responsive to an atomic range-compare-and-modify instruction providing indications of a data value storage location, a range start, and a range size generating the control signals such that the data processing logic performs an atomic range-compare-and-modify operation comprising, as an atomic set of steps: reading a base value stored at the data value storage location; determining an in-range condition to be true when the base value is within an request range having a lower-bound being the range start and an upper-bound being the range start plus the range size; and when the in-range condition is true, modifying the base value to an updated base value.

The present techniques will be described further, by way of example only, with reference to embodiments thereof as illustrated in the accompanying drawings, to be read in conjunction with the following description, in which:

FIG. 1 schematically illustrates apparatus comprising processing circuitry which may support the present techniques in some embodiments;

Figure 5:
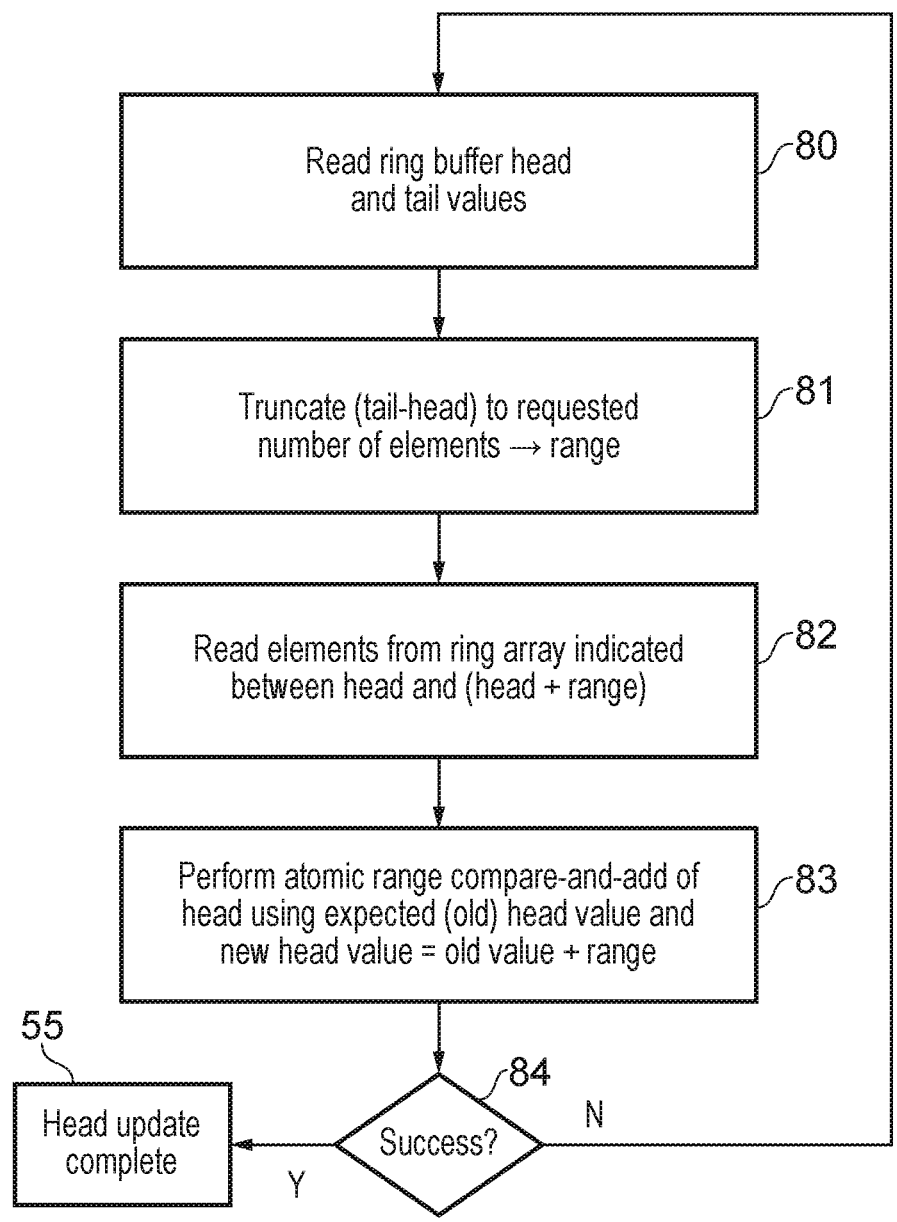
Figure 6A:
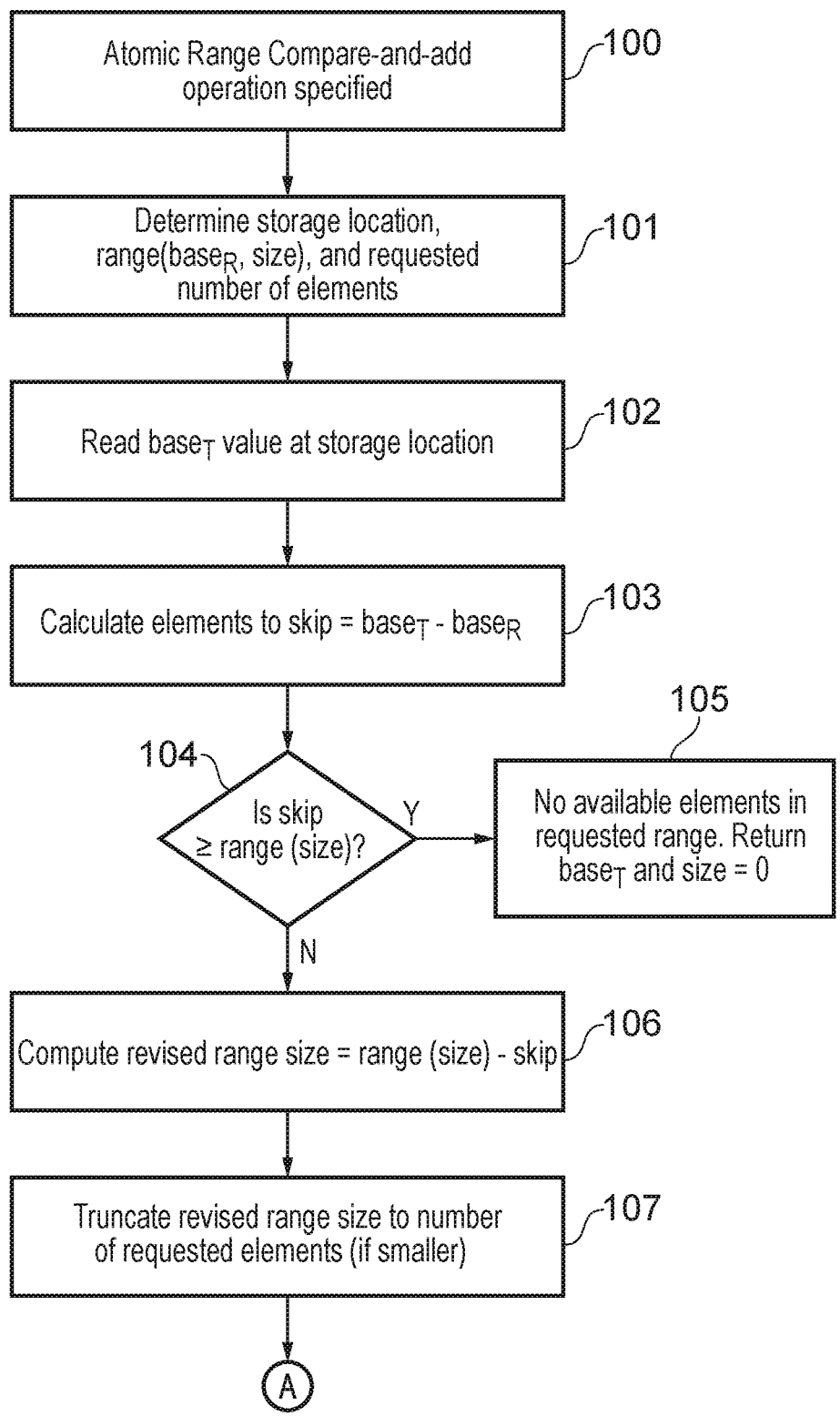
Figure 6B:
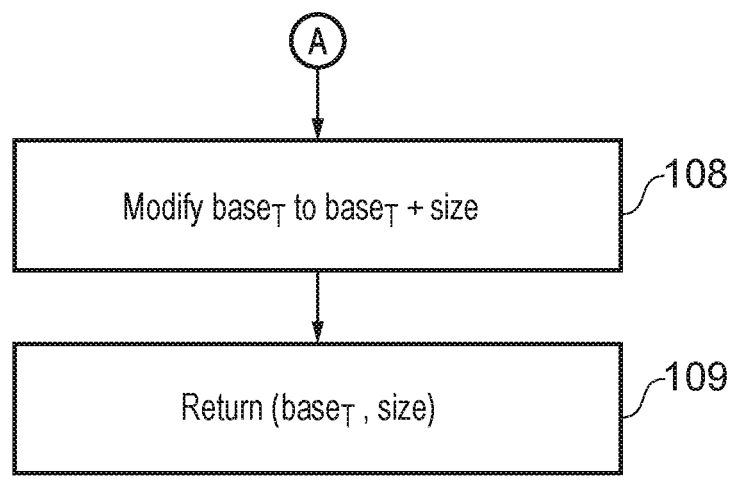
Figure 7A:
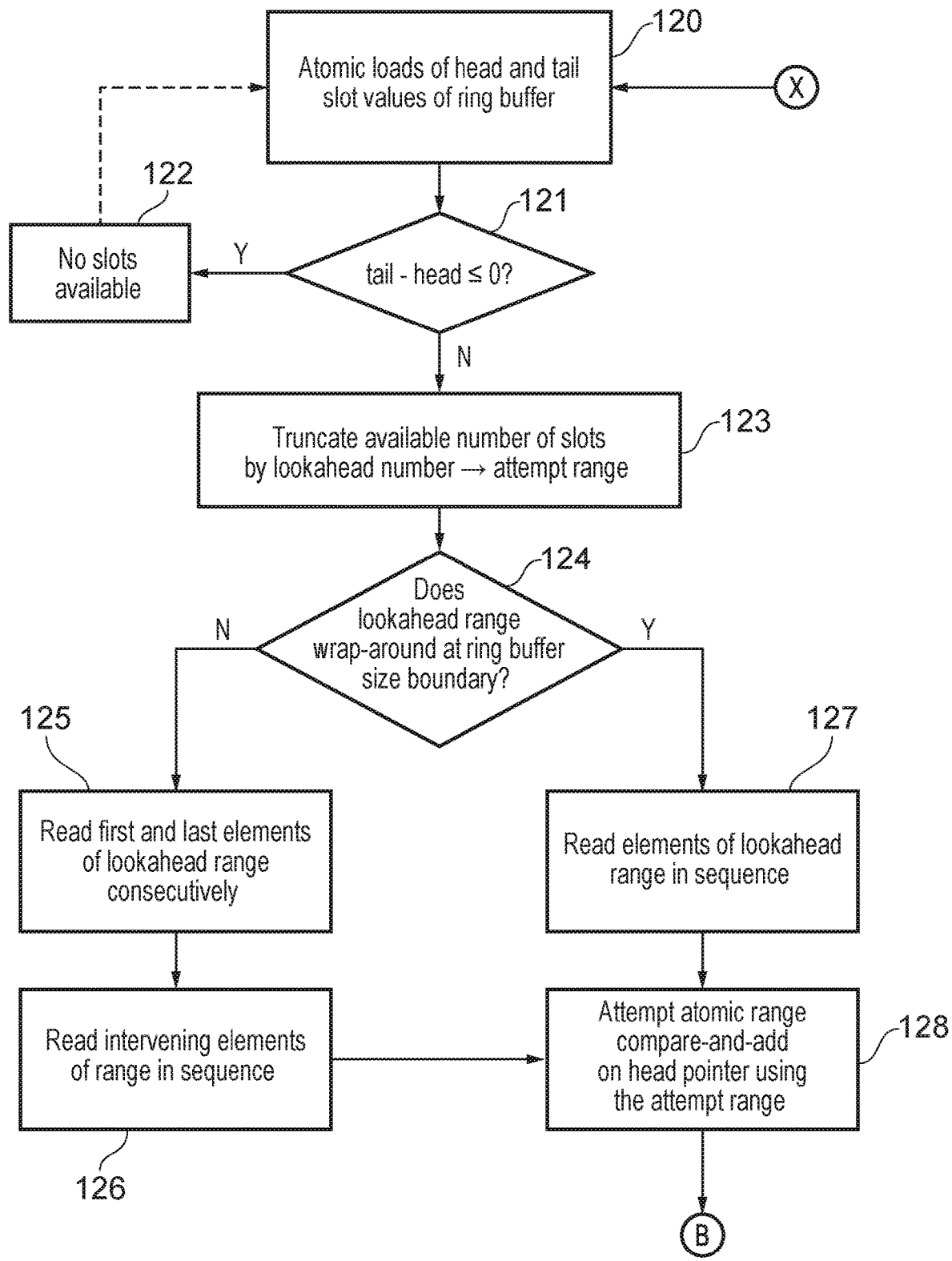
Figure 7B:
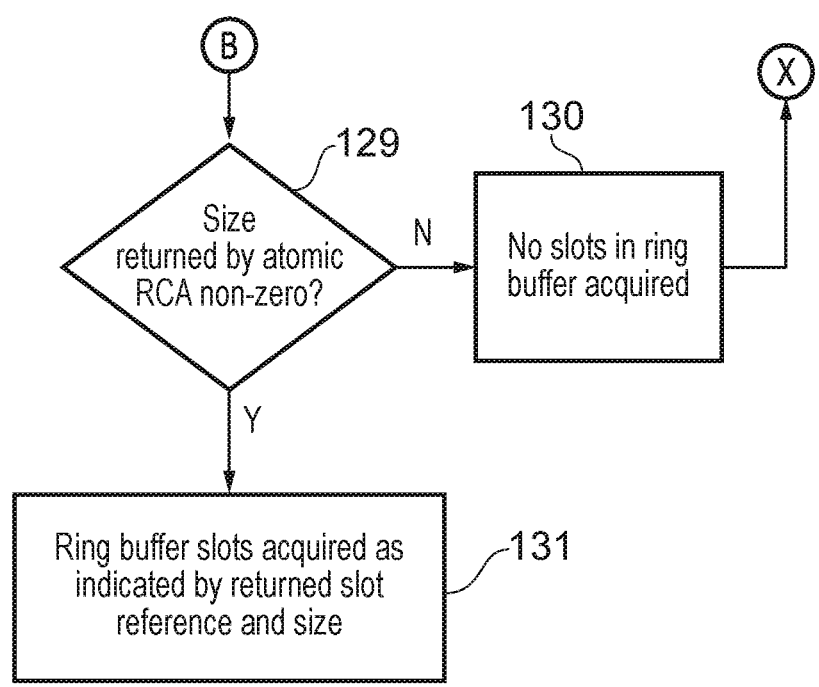
Figure 8A:
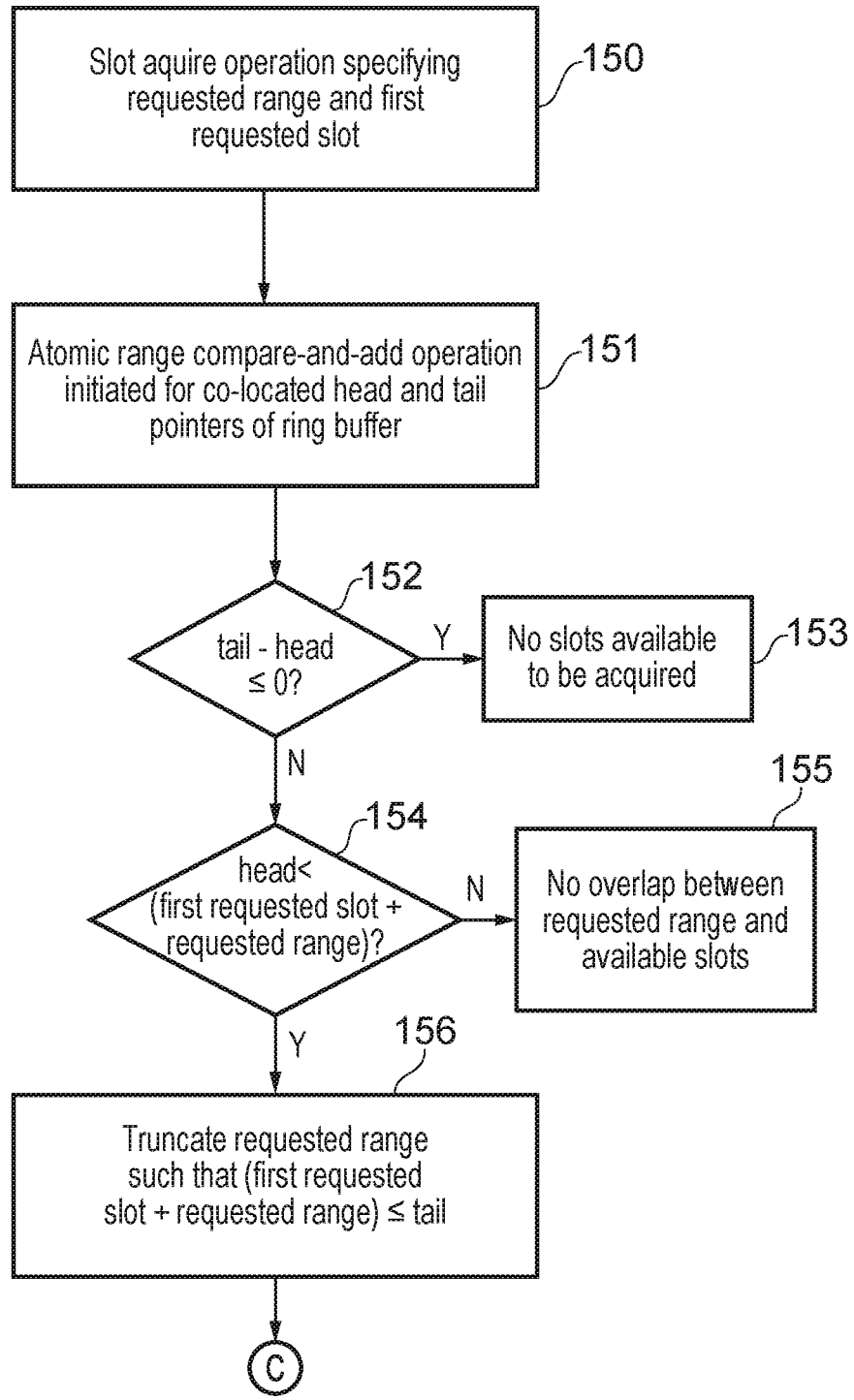
Figure 8B:
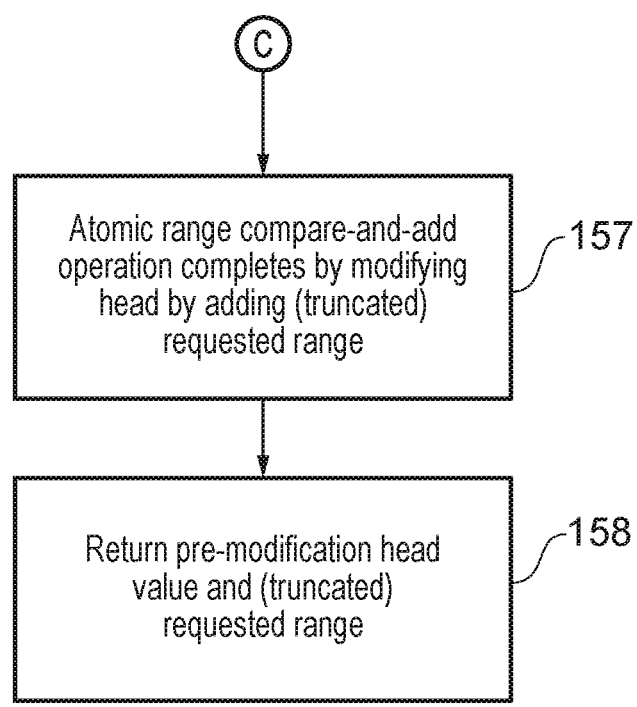
Figure 9:
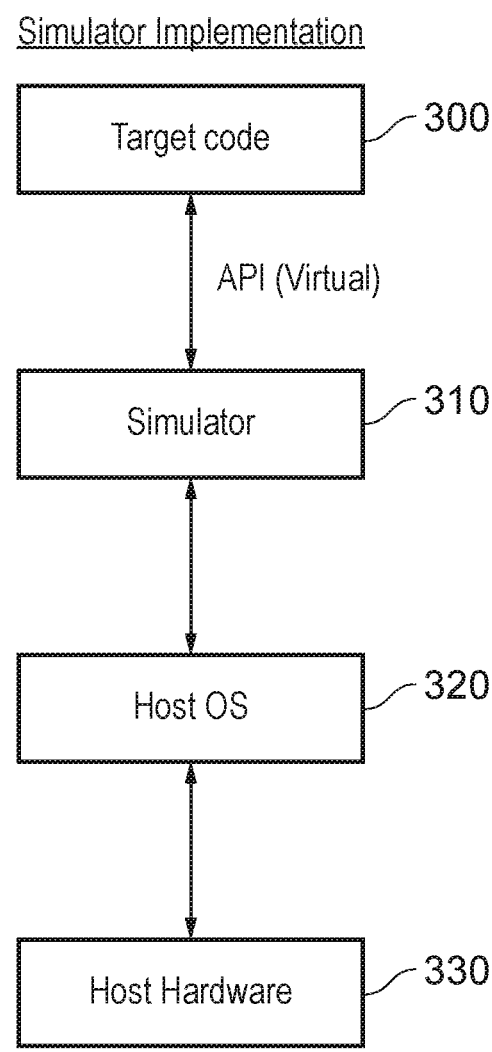

FIGS. 4A-4D schematically illustrate a portion of a ring buffer in some embodiments in which example content is shown, for embodiments in which multiple consumers seek to acquire and dequeue particular slots, where an atomic range compare-and-add operation is used;

FIG. 5 is a flow diagram showing a sequence of steps which are taken according to the method of some embodiments in which a process attempts to read a requested number of elements from a ring buffer with reference to specified ring buffer head and tail values using an atomic range compare-and-add operation on the head value;

FIGS. 6A and 6B show a sequence of steps according to the method of some embodiments when an atomic range compare-and-add operation is carried out;

FIGS. 7A and 7B are a sequence of steps which are taken according to the method of some embodiments when a process reads head and tail slot values of a ring buffer, and attempts an atomic range compare-and-add operation on the head pointer in which the wrap around nature of the enumeration of the slot values is taken into account;

FIGS. 8A and 8B are a sequence of steps which are taken according to the method of some embodiments when an atomic range compare-and-add operation is carried out with respect to a co-located head and tail pointer of a ring buffer in order to seek to acquire a specified number of slots in the ring buffer; and FIG. 9 schematically illustrates the components of a system which provides a simulator implementation in some embodiments.

At least some embodiments described herein provide an apparatus comprising: data processing circuitry to perform data processing operations in response to received instructions, wherein the data processing operations comprise an atomic range-compare-and-modify operation, wherein the atomic range-compare-and-modify operation is arranged to: receive indications of a data value storage location, a range start, and a range size; and as an atomic set of steps to: read a base value stored at the data value storage location; determine an in-range condition to be true when the base value is within a request range having a lower bound being the range start and an upper bound being the range start plus the range size; and when the in-range condition is true, modify the base value to an updated base value.

The present techniques propose a novel kind of atomic operation which is more resilient to contention (concurrent updates) than the above-mentioned basic atomic compare-and-swap operation. In particular instead of requiring an exact match between an expected value to be found at the relevant location and the value which is in fact found at that location, the atomic range-compare-and-modify operation disclosed performs the comparison with reference to a range of values. This range of values may be specified in a variety of ways, but essentially specifies a range start and a range size (although this could equivalently be specified using an absolute starting value and an absolute end value, where the range size is then clearly the difference between the two). In particular the condition test on which the range-compare-and-modify operation is based is that the value found at the storage location (referred to in this example as a "base value") falls within the specified range. When this is the case, the range-compare-and-modify operation is allowed to modify the base value to an updated base value. Greater flexibility in the determining condition is therefore provided, which can be a particular benefit in situations in which contention between concurrent updates may occur. This is because, for example taking the situation in which two operations concurrently seek to perform updates, if both were to seek to perform their updates using the known atomic compare-and-swap operation a race condition determines the outcome, wherein assuming that both initially read the same base value stored at the data value storage location, the operation which attempts the update first is successful and the other which comes second fails. However, by using the atomic range-compare-and-modify operation disclosed herein, each operation can specify an acceptable range of values to compare with the base value and assuming that the first operation does not modify the base value to an updated base value which is outside the range specified by the second operation, then the second operation can also be successful. Improved resilience to contention between concurrent updates is therefore supported.

Note that the upper bound of the range, being defined as the range start plus the range size, may be chosen to be inclusive or exclusive. The particular modification to the base value to produced the updated value by the atomic range-compare-and-modify operation may take a variety of forms and different embodiments may variously define what a legitimate updated base value may be. For example, in some embodiments there may in principle be no particular constraint imposed on what the updated base value may be, as long as the in-range condition is true. In other embodiments it may be the case that the request range also influences what the updated base value may be, for example the updated base value may, in some embodiments, be constrained to be within the request range.

In some embodiments the atomic range-compare-and-modify operation is an atomic range-compare-and-add operation, and wherein the atomic range-compare-and-add operation is arranged, when the in-range condition is true, to increase the base value to less than or equal to the upper bound to give the updated base value. Accordingly, when the in-range condition is true the base value is increased to up to the upper bound of the range, meaning that the operation implements a response to the range received in which as long as the in-range condition is true (i.e. the base value read from the data storage location is within the range), the base value is increased to up to the upper limit of the specified range. In some embodiments the atomic range-compare-and-modify operation does not further define the modification to be made to the base value and in such embodiments the base value may be increased to the upper limit of the specified range. However as will be discussed further below, in some embodiments the atomic range-compare-and-modify operation further defines the desired modification (increment) to be made to the base value and in such embodiments (when the in range condition is true the base value is increased by the desired modification (though still with a cap at the upper limit of the specified range).

The atomic range-compare-and-modify operation may return at least one value when it completes and this or these may be variously defined. In some embodiments the atomic range-compare-and-modify operation is arranged to return the base value as a result of the operation. It is to be understood therefore that this is the base value read from the data value storage location in the first of the atomic set of steps, i.e. is the unmodified base value. This may be returned, whether or not the in-range condition is found to be true and therefore whether or not the base value has in fact been updated.

Alternatively or in addition in some embodiments the atomic range-compare-and-modify operation is arranged to return a size value given by a difference between the base value and the updated base value. Again it is to be appreciated that this size value may be returned whether or not the in-range condition was in fact found to be true and therefore the size value can be used as an indication of whether the base value was in fact modified at all, in that if the size value is non-zero then the base value has been successfully modified.

It is of course not always the case that the in-range condition is found to be true and various embodiments may respond differently to this situation. For example, in some embodiments the atomic range-compare-and-modify operation is further arranged: to determine the in-range condition not to be true when the base value less the range start is greater than the range size; and when the in-range condition is not true, to generate a failure indication that the atomic range-compare-and-modify operation was not successful. The failure indication may take a variety of forms.

In some embodiments the failure indication comprises returning the base value as a result of the operation. In other words, when the in-range condition is not true and therefore the base value is not modified, returning the base value as a result of the operation is in itself indicative of this "failure" to modify the base value since it will be the same as the base value which was read.

Alternatively or in addition in some embodiments the failure indication comprises returning a zero value size as a result of the operation. This size=0 being returned indicates that there was no difference between the "updated" base value and the original base value, i.e. the base value has not been modified.

In some embodiment the atomic range-compare-and-modify operation is further arranged to receive a requested number of elements, and the atomic set of steps further comprises: determining a skip value given by the base value less the range start; and determining an available range size given by the range size less the skip size, wherein a modification difference between the updated base value and the base value is determined as a smaller value of the available range size and the requested number of elements. Thus although the atomic range-compare-and-modify operation receives the definition of a range (such as a range start and a range size) it may in such embodiments additionally receive a requested number of elements. In other words the initiator of the atomic range-compare-and-modify may make use of this operation in order to specify a requested number of elements, i.e. effectively a particular modification to the base value which is sought. Thus, when the in-range condition is true such embodiments modify the base value by the smaller of the available range and the requested number of elements. Further, the available range size may depend on a difference which may exist between the base value read and the start of the range. For example if the base value falls part way through the defined range then may be the case in some embodiments that the full range is not then available for a modified base value, but rather say only those values which follow the base value. Moreover, there may be a difference between the available range size (e.g. from the read base value upwards to the end of the range) and the requested number of elements. In this situation, where one exceeds the other the smaller is taken for the modification, which is made to the base value to give the updated base value.

The present techniques may be implemented in a variety of contexts, but in some embodiments the apparatus further comprises: storage circuitry to store components of a ring buffer comprising multiple slots to hold queued indications of data items, wherein the data processing operations performed by the data processing circuitry in response to received instructions comprise a dequeuing operation with respect to the queued indications of data items in the ring buffer, and wherein the dequeuing operation comprises: specifying a dequeuing head pointer for the ring buffer to indicate the data value storage location; specifying as the range size a number of slots for which exclusive access is sought for the dequeueing operation; and specifying as the range start a first slot for which exclusive access is sought for the dequeueing operation. The administration of a ring buffer, and in particular where exclusive access to a specified number of slots of the ring buffer is sought as part of a dequeuing operation with respect to the content of those slots, is a context in which the disclosed atomic range-compare-and-modify operation may find particular application. This is because, when multiple processes concurrently seek to access and modify the dequeuing head pointer of such a ring buffer, contention may arise and the present techniques for handling the modification a base value (here a value of the dequeuing head pointer) can largely avoid such contention and thus better support the concurrent operation of multiple dequeuing operations.

In some such embodiments the data processing circuitry is arranged to perform a range size truncation comprising: reading a head value of the dequeuing head pointer for the ring buffer; reading a tail value of a dequeuing tail pointer for the ring buffer; and truncating the range size such that a last slot indicated by the range start plus the range size falls between the head value and the tail value. A dequeuing head pointer and a dequeuing tail pointer may be defined to indicate the range of slots in the ring buffer from which items are available for dequeuing and it is therefore beneficial to the present techniques if the range size specified for the atomic range-compare-and-modify operation is truncated to ensure that the range start plus the range size falls between the head value and the tail value, and to ensure that the modification operation is limited to a modification of the base value (i.e. the head value) which cannot exceed the tail value.

The range size truncation may be performed at various opportunities, and in some embodiments the data processing circuitry is arranged to perform the range size truncation prior to performing the atomic set of steps. Generally it is preferable if the set of steps defined to be atomic is limited to only those step which strictly need to be atomic, since failure of any step within the atomic set of steps causes the entire set of steps to fail, and therefore performance of the range size truncation prior to performing the atomic set of steps is, at least from this perspective, beneficial.

Conversely in some embodiments certain metadata associated with a ring buffer—the head and tail pointer—may be co-located. Here the "collocation" of the head and tail pointer may mean that both are stored at a single specified location, such that access to once necessarily involved access to the other. However other varieties of collocation are also envisaged. For example, two different values (pointers) may be stored (one for each), but where the two pointers are located one after the other (in terms of memory addresses) and possibly being properly aligned, such that they then can be specified using one address and potentially (but not necessarily) read atomically. In such embodiments it may be preferable to perform the range value truncation within the atomic set of steps. Accordingly, in some embodiments the dequeuing head pointer for the ring buffer is co-located with the dequeuing tail pointer for the ring buffer, and wherein the atomic range-compare-and-modify operation comprises: receiving a location of the co-located dequeuing head pointer and dequeuing tail pointer as the data value storage location, and wherein the atomic set of steps further comprises performing the range value truncation.

In some such embodiments before performing the atomic set of steps it may be determined if the end of the range (i.e. the range start plus the range size) "wraps around" with respect to the enumeration of the multiple slots of the ring buffer. It will be understood that the enumeration of the multiple slots of the ring buffer will typically take a sequential set of values from a lowest (e.g. 0) value to a maximum value, where the 0 slot is defined to immediately follow the maximum value slot, thus providing the circular nature of the ring buffer. Here it should be noted that what is sought to be identified is the wraparound of what may be called the "physical" ring slots (which are numbered 0 . . . [ring_size–1]). The "logical" ring indexes are free-running (e.g. 32-bit) values, but are modulo ring_size (remainder of division) when converted to the physical indexes which are used to actually access the ring slots. This configuration however also has implications for the relative storage location of the slots around the wraparound point in memory, e.g. where slot numbers essentially correspond in a linear mapped fashion to memory addresses the lowest and highest enumerated slot numbers may be stored at very different memory locations, despite being technically adjacent in the circular ring buffer. This being the case these sequentially adjacent slots (the maximum slot value slot and the zero slot) and indeed the first and last slot of the range are likely to be stored at widely separated memory locations. In recognition of this, in some embodiments the data processing circuitry is arranged, prior to performing the atomic set of steps, to determine a wrap-around condition to be true when the range start plus the range size is greater than a largest value used for enumeration of the multiple slots of the ring buffer, and when the wrap-around condition is not true, prior to performing the atomic set of steps, to initiate a first read operation with respect to a first slot indicated by the range start followed by a second read operation with respect to a last slot indicated by the range start plus the range size. Thus when the wrap-around condition is not true, i.e. the specified range is contiguous, the first and last elements (in the first and last specified slots) are read in immediate sequence, (and reads to the intervening slots may also be initiated prior to performing the atomic set of steps) so that cache misses can be handled in parallel and thus utilise memory level parallelism.

In a complementary fashion in some such embodiments the data processing circuitry is arranged, when the wrap-around condition is true, prior to performing the atomic set of steps, to initiate a sequence of read operations with respect to a sequence of slots from the first slot to the last slot. Here the elements of the first and last slot of the range are likely to be stored at widely separated memory locations. Although memory level parallelism would be useful since the first and last elements are very likely to be located in different cache lines (and even in different MMU pages), it is further recognised here that wrap-around will typically be a relatively infrequent event and therefore the benefit of providing an arrangement of the operations which seeks to gain better performance in this situation is viewed as outweighed by the cost of providing such a bespoke response for this relatively rare situation. Accordingly the sequence of slots is simply read in order from the first slot to the last slot.

However in other embodiments the data processing circuitry is arranged, when the wrap-around condition is true, prior to performing the atomic set of steps, to initiate a first read operation with respect to a first slot indicated by the range start followed by a second read operation with respect to a last slot indicated by the range start plus the range size. Reads to the intervening slots may also be initiated prior to performing the atomic set of steps. Hence also here (when the when the wrap-around condition is true), this approach may also be taken to seek to provoke cache misses to be handled in parallel and thus utilise memory level parallelism.

At least some embodiments herein provide a data processing method comprising: performing data processing operations in response to received instructions, wherein the data processing operations comprise an atomic range-compare-and-modify operation, wherein the atomic range-compare-and-modify operation is arranged to: receive indications of a data value storage location, a range start, and a range size; and as an atomic set of steps to: read a base value stored at the data value storage location; determine an in-range condition to be true when the base value is within a request range having a lower-bound being the range start and an upper-bound being the range start plus the range size; and when the in-range condition is true, to modify the base value to an updated base value.

At least some embodiments herein provide a data processing apparatus comprising: instruction decoder circuitry to decode instructions and to generate control signals dependent on the instructions; and data processing circuitry to perform data processing operations in response to the control signals, wherein the instruction decoder circuitry is responsive to an atomic range-compare-and-modify instruction providing indications of a data value storage location, a range start, and a range size to generate the control signals such that the data processing circuitry performs an atomic range-compare-and-modify operation comprising, as an atomic set of steps: reading a base value stored at the data value storage location; determining an in-range condition to be true when the base value is within an request range having a lower-bound being the range start and an upper-bound being the range start plus the range size; and when the in-range condition is true, modifying the base value to an updated base value.

At least some embodiments herein provide a method of data processing comprising: decoding instructions and generating control signals dependent on the instructions; and performing data processing operations in response to the control signals, wherein the decoding instructions comprises, in responsive to an atomic range-compare-and-modify instruction providing indications of a data value storage location, a range start, and a range size generating the control signals such that the data processing circuitry performs an atomic range-compare-and-modify operation comprising, as an atomic set of steps: reading a base value stored at the data value storage location; determining an in-range condition to be true when the base value is within an request range having a lower-bound being the range start and an upper-bound being the range start plus the range size; and when the in-range condition is true, modifying the base value to an updated base value.

At least some embodiments herein provide a computer program for controlling a host data processing apparatus to provide an instruction execution environment comprising: instruction decoder logic to decode instructions and to generate control signals dependent on the instructions; and data processing logic to perform data processing operations in response to the control signals, wherein the instruction decoder logic is responsive to an atomic range-compare-and-modify instruction providing indications of a data value storage location, a range start, and a range size generating the control signals such that the data processing logic performs an atomic range-compare-and-modify operation comprising, as an atomic set of steps: reading a base value stored at the data value storage location; determining an in-range condition to be true when the base value is within an request range having a lower-bound being the range start and an upper-bound being the range start plus the range size; and when the in-range condition is true, modifying the base value to an updated base value.

Some particular embodiments are now described with reference to the figures.

Figure 1:
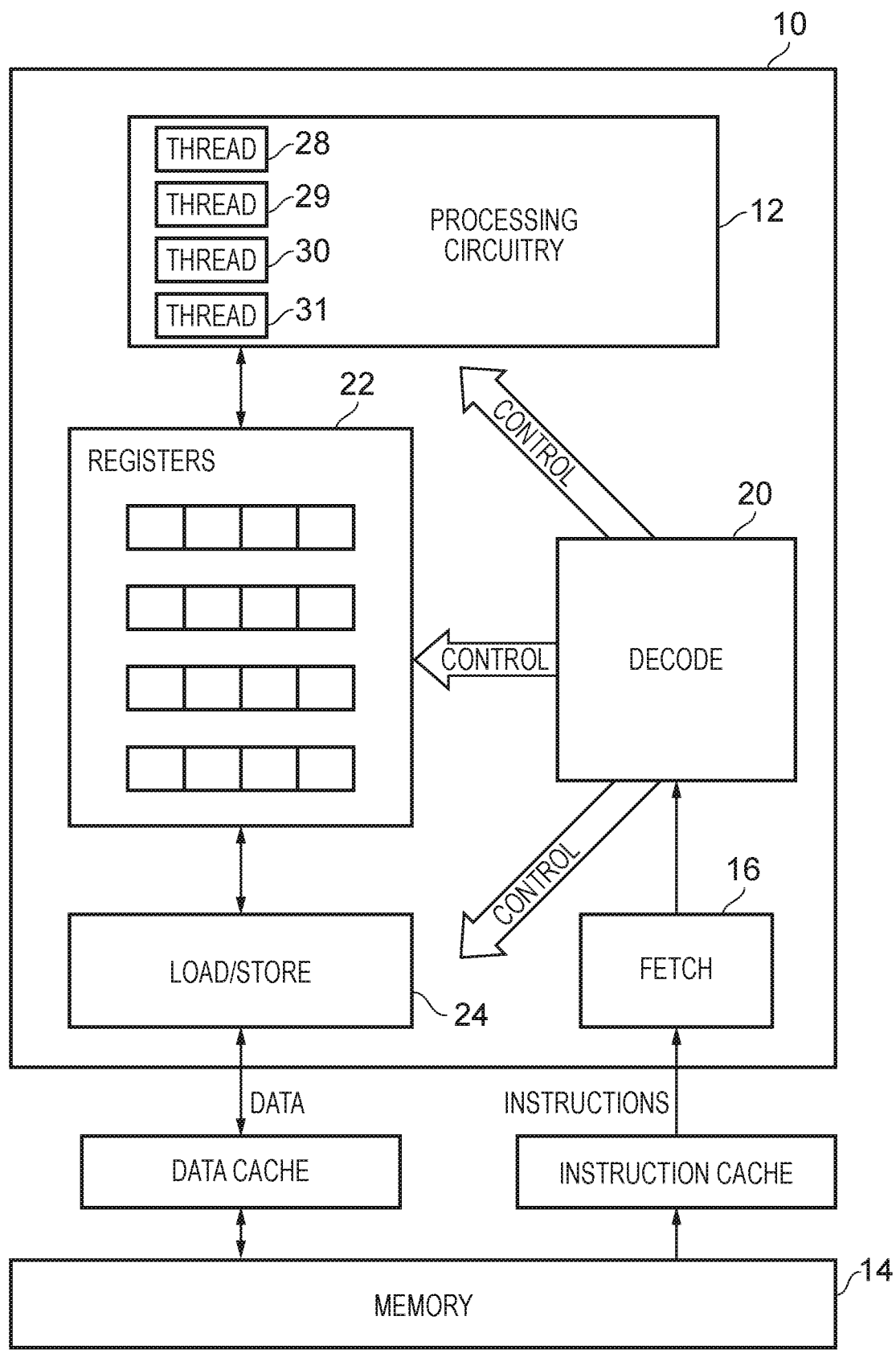

FIG. 1 schematically illustrates an apparatus 10 which may embody various examples of the present techniques. The apparatus 10 illustrated in FIG. 1 comprises data processing circuitry 12 which performs data processing operations on data items in response to a sequence of instructions. These instructions are retrieved from a memory 14 and, in a manner with which one of ordinary skill in the art will be familiar, fetch circuitry 16 is provided to support this. The instructions caused to be retrieved from the memory 14 by the fetch circuitry 16 are passed to the instruction decoding circuitry 20, which generates control signals which are arranged to control various aspects of the configuration and operation of the processing circuitry 12, as well as of a set of registers 22 and a load/store unit 24. It will be appreciated that the illustration of FIG. 16, for the purposes of providing a brief coherent overview, is only provided at a high level of abstraction, and many detailed aspects of the configuration of such a data processing apparatus (with which one of ordinary skill in the art will be familiar) are omitted merely for clarity of illustration and discussion. Data values required by the data processing circuitry 12 (as defined in the instructions which it executes) are retrieved from the memory 14, may be cached in a data cache (not explicitly shown and which may in fact comprise a hierarchy of cache levels) and are stored in the registers 22, in order to allow particular data operations on those data values to be carried out by the processing circuitry 12. Thus modified, a data item held in a register 22 may be caused to be stored back to memory. The retrieval of data items from the memory 14 and the storing of data items back to the memory 14 is administered by the load/store circuitry 24. Note also that four threads 28, 29, 30, and 31 are conceptually shown within the processing circuitry 12, illustrating the fact that this processing circuitry is multi-threaded, i.e. meaning that it can concurrently execute multiple data processing threads (i.e. sequences of instructions). The decoding circuitry 20 of this illustrated example is also specifically provided such that it recognizes and is responsive to the above-mentioned atomic range compare-and-modify instruction and atomic range compare-and-add instruction. When such an instruction is encountered the control signals generated cause the processing circuitry to perform the atomic range compare-and-modify (or -add) operation as described in one of the examples above or elsewhere herein. Equally the decoding circuitry 20 of this illustrated example may also be responsive to a sequence of other instructions which, in combination, cause the performance the atomic range compare-and-modify operation or atomic range compare-and-add operation in one of the examples as described above or elsewhere herein.

Figure 2:
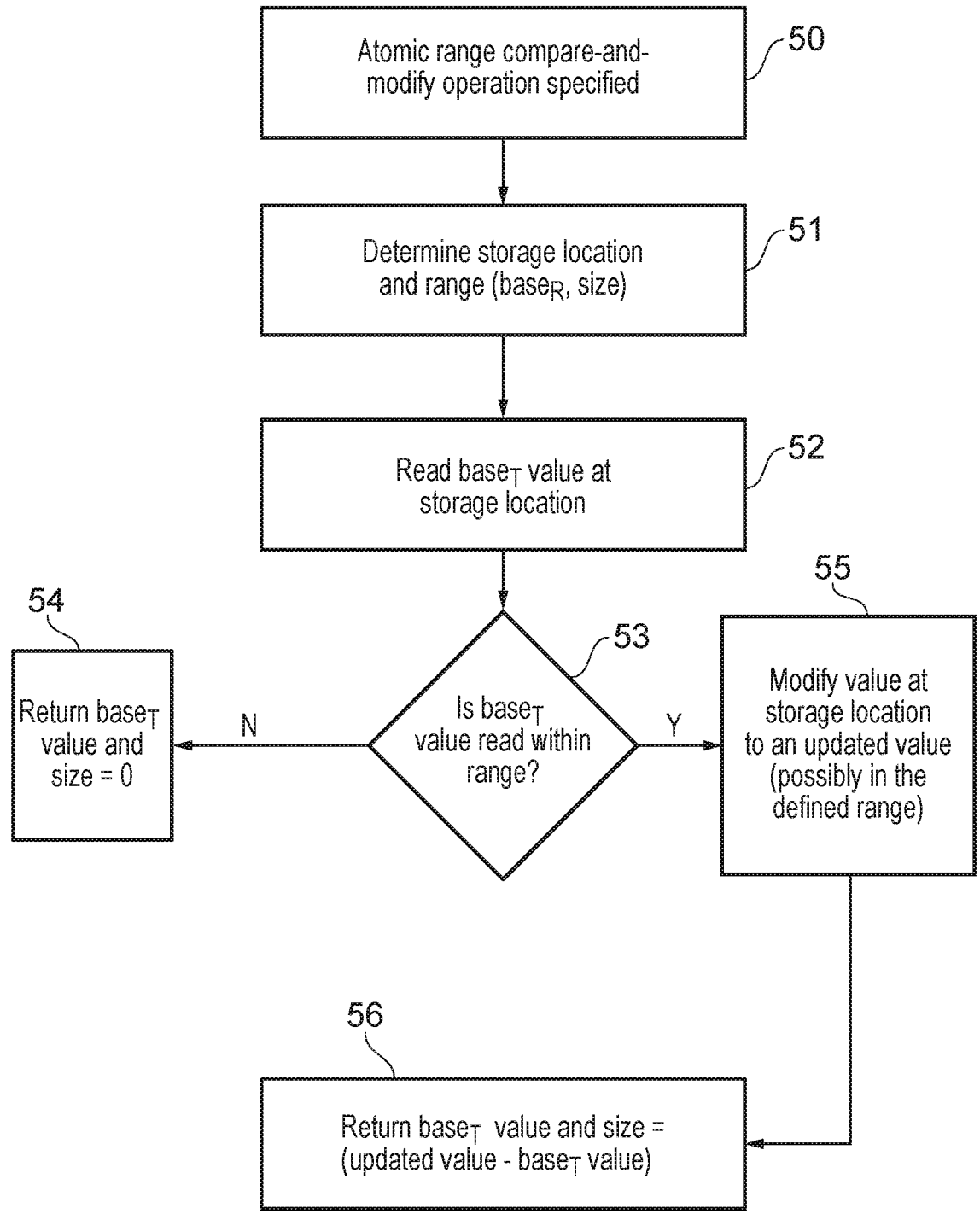
FIG. 2 is a flow diagram showing a sequence of steps which are taken according to the method of some embodiments which an atomic range compare-and-modify operation is carried out.

FIG. 2 shows a sequence of steps which are taken according to the method of some embodiments. These steps begin at step 50, when an atomic range compare-and-modify (atomic RCAM) operation according to the present techniques is specified. As mentioned above with reference to FIG. 1 it should be appreciated that the specification of this operation may result from a sequence of instructions which in combination cause the steps shown in FIG. 2 to be carried out, or alternatively this may be as a response of the data processing apparatus to a received atomic range compare-and-modify instruction as proposed by the present techniques, which executed as a single instruction causes the steps shown in FIG. 2 to be carried out. From step 50 the flow proceeds to step 51 where the storage location and the range are determined, noting that various mechanisms may provide the operation with the indications of this storage location and the range. For example they may be directly specified, they may be specified with reference to a storage location (whether in a register or in memory) in which they are to be found (or indeed reference pointers to them are to be found). Further the range itself may be defined as an absolute range start and range end, or may for example alternatively be specified by a range start and a range size. The information provided by either can readily be converted into the other (i.e. range start+size=range end, or equivalently range end−range start=range size). The base value of the range is referred to in the figure as $base_R$. Then at step 52 a base value ($base_T$) is read from the storage location. At step 53 it is determined if the base value read from the storage location is within the defined range. If it is not then the read base value and a size of zero are returned as the result of the operation at step 54. Alternatively when the read base value is within the range then the flow proceeds to step 55 where the value at the storage location is modified to an updated value. This may be constrained to be within the defined range but, as indicated by the parenthesises around the phrase "possibly in the defined range" this is not essential and in some examples the updated value may be entirely freely specified. Finally the flow proceeds to step 56, where the read base value ($base_T$) and a size value being the difference between the updated value and the originally read base value (at step 52) are returned as a result of the operation. It is important to note that where the steps of FIG. 2 are an implementation of an atomic range compare-and-modify operation, the steps 52, 53, and 54 are performed atomically, i.e. indivisibly—either they all take effect or none take effect.

Figure 3:
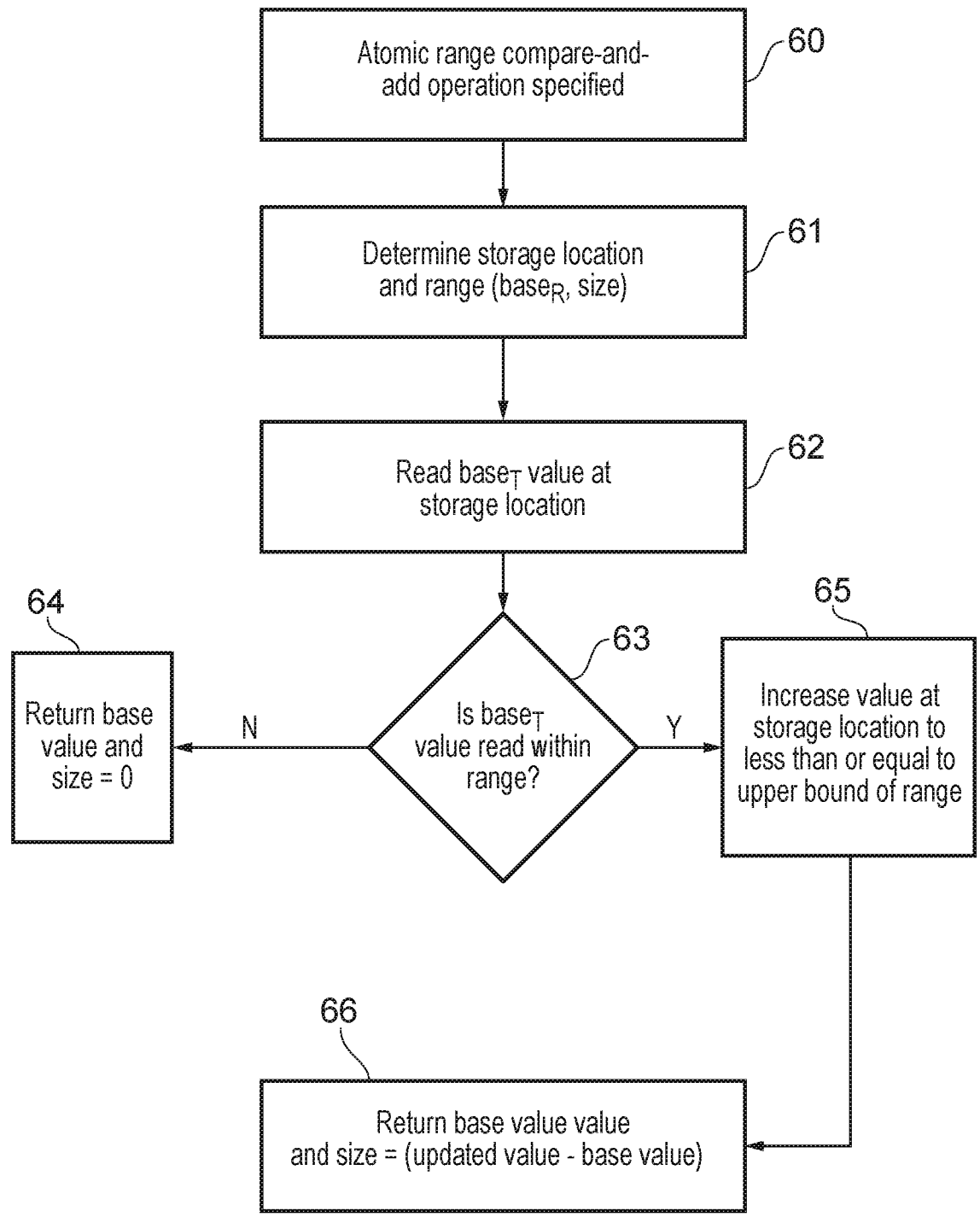
FIG. 3 is a flow diagram showing a sequence of steps which are taken according to the method of some embodiments when an atomic range compare-and-add operation is carried out.

FIG. 3 shows a sequence of steps which are taken according to the method of some embodiments. These steps begin at step 60, when an atomic range compare-and-add operation according to the present techniques is specified. As mentioned above with reference to FIG. 1 it should be appreciated that the specification of this operation may result from a sequence of instructions which in combination cause the steps shown in FIG. 3 to be carried out, or alternatively this may be as a response of the data processing apparatus to a received atomic range compare-and-add instruction as proposed by the present techniques, which executed as a single instruction causes the steps shown in FIG. 3 to be carried out. From step 60 the flow proceeds to step 61 where the storage location and the range are determined, noting again that various mechanisms may provide the operation with the indications of this storage location and the range. As discussed above with reference to FIG. 2, these may be direct, by reference, and be absolute or relative values. The base value of the range is again referred to in this figure as $base_R$. Then at step 62 a base value ($base_T$) is read from the storage location. At step 63 it is determined if the base value read from the storage location is within the defined range. If it is not then the read base value and a size of zero are returned as the result of the operation at step 64. Alternatively when the read base value is within the range then the flow proceeds to step 65 where the value at the storage location is increased to an updated value, which is constrained to be less than or equal to the upper bound of the defined range. Finally the flow proceeds to step 66, where the read base value (base$_T$) and a size value being the difference between the updated value and the originally read base value (at step 62) are returned as a result of the operation. It is again important to note (as for FIG. 2) that where the steps of FIG. 4 are an implementation of an atomic range compare-and-add operation, the steps 62, 63, and 64 are performed atomically, i.e. indivisibly—either they all take effect or none take effect.

Figure 4A:
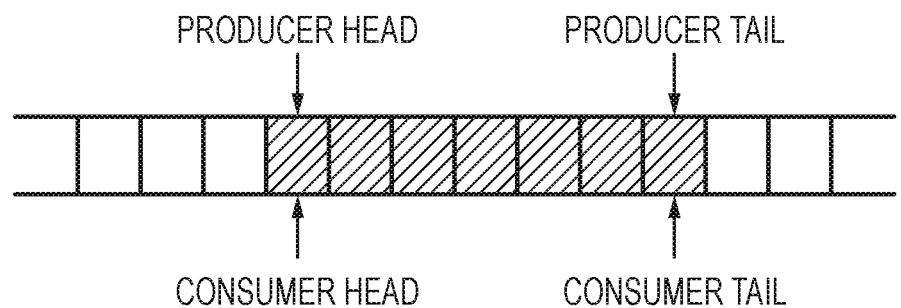
Figure 4B:
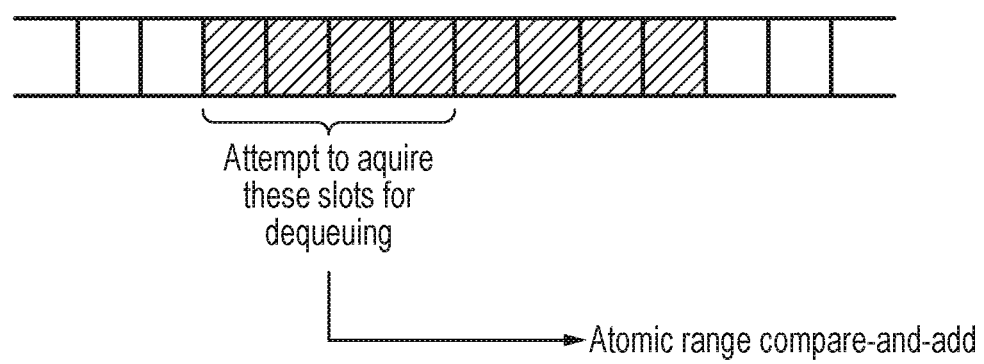
Figure 4C:
Figure 4D:
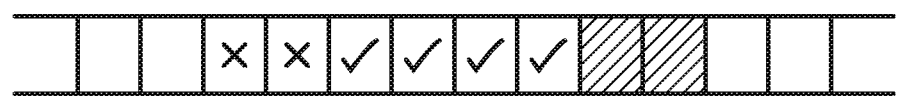

FIGS. 4A-D schematically illustrate a sequence of slots of a ring buffer with a set of enqueued data items indicated by the hatched slots. This ring buffer is accessed by multiple producers and multiple consumers (where producers add items to the ring buffer and consumers remove them) and for this purpose producer head and tail pointers are maintained and consumer head and tail pointers are maintained. FIG. 4B schematically illustrates that a consumer may attempt to acquire the oldest four slots contained data items in the ring buffer in order to dequeue these data items. For this purpose this consumer process makes use of the atomic range-compare-and-add (RCAA) operation of the present techniques. This may for example comprise the consumer process carrying out the atomic RCAA specifying the range as comprising these four slots, but a particularly useful approach is for the process to specify say all available slots (i.e. those which contain items ready for dequeuing, namely those slots bounded by the head and tail pointers). Nevertheless, the process may only want (e.g. have capacity to process) four elements and this requested number of 4 elements (slots) is specified. Accordingly the process carrying out the atomic RCAA operation reads the consumer head and tail pointers, determines the range to specify with respect to the difference between the two, and then carries out the atomic range compare-and-add operation specifying that range and requesting four slots. FIG. 4C indicates a successful result of this operation, when the first four slots are successfully acquired for dequeuing (indicated by the ticks in these slots). FIG. 4D however illustrates an alternative outcome as a result of the same attempted atomic RCAA operation, where before the atomic set of steps of this atomic RCAA operation could be carried out another process had acquired the first two slots. In this situation the first two slots are not acquired and instead the requested four slots are shifted to the right by two with respect to the example of FIG. 4C, since the range comparison was still successful (the new base value (head pointer value) is still within the defined range and indeed four slots were also available.

FIG. 5 shows a sequence of steps which are taken according to the method of some embodiments with respect to the performance of an atomic range compare-and-add (RCAA) operation concerning a ring buffer (such as that discussed above with reference to FIGS. 4A-D) for which head and tail pointer values are available. The flow begins at step 80, where the ring buffer head and tail values (for example as specified by a consumer head pointer and a consumer tail pointer) are read. Next at step 81 the difference between the two (tail−head) is truncated to the requested number of elements specified for the atomic RCAA operation in order to give a range value. Then at step 82 read operations are initiated for the elements stored in the ring buffer array indicated between the head value and (head+range), noting that this upper value may be less than the tail value. Then at step 83 the atomic RCAA operation is carried out with respect to the head value (i.e. with respect to the head pointer) using range defined by the expected head value i.e. that read at step 80 and a this expected (old) value plus the determined range. When this atomic RCAA is a success (determined at step 84) then the flow proceeds to step 85 where the update of the head value is complete). This means that the head pointer has been successfully updated, though noting that this may have been shifted on to any value within the defined range, as long as the head value read as part of the atomic RCAA operation fell within that defined range (allowing the RCAA to be successful), and the head value read as part of the atomic RCAA operation and a size value (indicating the difference between the head value read and its updated value) are returned such that the process which initiated the atomic RCAA operation knows which slots it has acquired. If however it is determined at step 84 that it is not a success, i.e. the read head pointer value had already moved out of the defined range, then the flow returns to step 80 for a fresh attempt to perform an update, beginning with fresh reads of the ring buffer head and tail values at step 80.

FIG. 6 (shown split across FIGS. 6A and 6B but to be read in combination) shows a sequence of steps which are taken according to the method of some embodiments when an atomic range-compare-and-add (RCAA) operation is to be carried out. The flow begins at step 100 where the atomic RCAA operation is specified. Next at step 101 the relevant storage location, range (which may be defined in terms of a base value and size, but as discussed above may also be defined in different but equivalent ways) and a requested number of elements. Then at step 102 a base value is read from the storage location. Next at step 103 a number of elements to skip is calculated as a difference between the base value read from the storage location at step 102 and the base value of the range determined at step 101. Next at step 104 it is determined if the skip value is greater than or equal to the defined size of the range. If this is the case then the flow proceeds to, and concludes at, step 105 since there are no available elements in the requested range. The operation returns the base value read from the storage location and a size of zero as its result. The process which initiated this RCAA operation may in response to the flow reaching step 105 initiate a new RCAA operation with updated parameters. If however at step 104 it is determined that the number of elements to skip is not greater than or equal to the size of the range, then the flow proceeds to step 106, where a revised range size is calculated given by the range size specified at step 101 less the number of elements to skip. Then at step 107 the range size is truncated to the number of requested elements if this is smaller. Next at step 108 the value stored at the storage location is modified to become the value read at step 102 plus the range size (where this range size may have been modified by either or both of steps 106 and 107). Finally the operation returns the modified base value and the range size (i.e. that which may have been modified by steps 106 and/or 107) as a result of the operation at step 109. It is again important to note that where the steps of FIG. 6 are an implementation of an atomic RCAA operation, where the importance of the atomicity is to avoid that the base value is modified by another agent once it has been initially read. Hence the first of these atomic steps is that which immediately follows step 102 (the reading of the base value at the storage location), and thus steps 103, 104, 106, 107, and 108 are performed atomically, i.e. indivisibly—either they all take effect or none take effect (this effect referring to effect outside the steps of the operation itself).

FIG. 7 (shown split across FIGS. 7A and 7B but to be read in combination) shows a sequence of steps which are taken according to the method of some embodiments when access to the slots of a ring buffer is made by a process to acquire a set of slots (e.g. for dequeuing processed data items stored therein). The flow can be considered to begin at step 120 where atomic loads of the head and tail slot values of the ring buffer are made. Then at step 121 it is determined if these values differ by more than zero and when this is not the case this indicates there are no slots available to be acquired (step 122). The flow may concludes at step 122, or optionally (dashed arrow) the flow may return from step 122 to step 120 if a renewed attempt to acquire slots should be made possibly after a suitable brief delay. When however the difference between the tail and head values is non-zero, i.e. there is at least one slot available for acquisition, then the flow proceeds to step 123 where this available number of slots is truncated by a defined "lookahead" number to give an attempt range. Then at step 124 it is determined if the lookahead range wraps around at the ring buffer size boundary. In other words it is determined if the set of values in this look ahead range crosses the point at which the enumeration of the slots of the ring buffer wraps around from a maximum numerical value to a minimum numerical value used. Here it should be noted that what is sought to be identified is the wraparound of what may be called the "physical" ring slots (which are numbered 0 . . . [ring_size−1]). The "logical" ring indexes are free-running (e.g. 32-bit) values, but are modulo ring_size (remainder of division) when converted to the physical indexes which are used to actually access the ring slots. When this is not the case the flow proceeds to step 125 where the first and last elements (i.e. held in the first and last slots) of the look ahead range are caused to be read consecutively, i.e. a read for the first element is immediately followed by a read for the last element. Since the specified range is contiguous, the first and last elements (in the first and last specified slots) are read in immediate sequence, because the lookahead may access more than one cache line (and thus cause multiple cache misses) so that cache misses can be handled in parallel and thus utilise memory level parallelism. Then at step 126 the intervening elements (between first and last elements) are read in sequence. Alternatively, when it is found at step 124 that the lookahead range does wrap around at the ring buffer size boundary then the flow proceeds to step 127, where the set of elements in the lookahead range are simply read in sequence. From either steps 126 or step 127 the flow then proceeds to step 128 where an atomic range-compare-and-add (RCAA) operation is attempted on the head pointer using the attempt range determined at step 123. Then at step 129 it is determined if the size returned as a result by the atomic RCAA operation is non-zero. If it is not, then no slots in the ring buffer have been acquired (step 130) and the flow then returns to step 120 for a fresh attempt to acquire slots is initiated. However when the size returned by the atomic RCAA operation is determined at step 129 to be non-zero, then the flow proceeds to step 131 where a number of ring buffer slots have been acquired as indicated by the slot reference and size returned as a result of the atomic RCAA operation.

This approach of the procedure of FIG. 7 is thus to read ("look ahead") by multiple elements (starting from the head value) in the ring buffer and using the atomic RCAA operation to allocate the first element (if any) in the range that is still available. It doesn't matter that the head pointer may have already been updated by another thread (process) as long as some element in the lookahead range is still available. The larger the lookahead range, the higher probability for success from the RCA operation, although it should be borne in mind that there is more also more overhead to read the lookahead elements. Software can decide which trade-off to adopt, where no lookahead gives lock-free behaviour, but contention causes retries, whereas a larger lookahead give what approaches wait-free behaviour (at the cost of the overhead of the greater number of lookahead reads). The chosen trade-off will depend on the application requirements and on the contention level. Efficient lookahead is however important or unnecessary cache misses will cause extra overhead. As long as the lookahead elements are contiguous in memory (don't wrap around at the end of the ring), elements can be read using a base pointer and constant offsets. More elements than are actually available can be read, as long as the non-available elements are not actually used. An example code sequence implementing a procedure similar to that of FIG. 7 is:

```
uint32_t ringbuf_dequeue_w_lookahead(struct ringbuf *rb, element ev[ ], uint32_t num)
{
#define LOOKAHEAD 6
    element lookahead[LOOKAHEAD];
    uint32_t head, tail, mask = rb->cons.mask;
    struct range r;
    do
    {
        //Step 1: check availability of elements to dequeue
        head = __atomic_load_n(&rb->prod.head, __ATOMIC_RELAXED);
        tail = __atomic_load_n(&rb->cons.tail, __ATOMIC_ACQUIRE);
        int32_t avail = (int32_t)(tail - head);
        if (avail <= 0)
        {
            return 0;
        }
        avail = MIN(avail, LOOKAHEAD);
        //Step 2: read elements speculatively
        uint32_t ring_size = mask + 1;
        if ((head & mask) + LOOKAHEAD <= ring_size)
        {
            //Fast-path: lookahead range is contiguous
            element *base = &rb->ring[head & mask];
            //Load first and last element immediately after each other to
            //parallelise (any) cache misses (MLP - memory level parallelism)
```

```
            lookahead[0] = base[0];
            lookahead[LOOKAHEAD - 1] = base[LOOKAHEAD - 1];
            lookahead[1] = base[1];
            lookahead[2] = base[2];
            lookahead[3] = base[3];
            lookahead[4] = base[4];
        }
        else
        {
            //Slow-path: lookahead range wraps around end of ring
            for (uint32_t i = 0; i < (uint32_t)avail; i++)
            {
                lookahead[i] = rb->ring[(head + i) & mask];
            }
        }
        //Step 3: attempt to acquire elements and release elements in the specified range
        r = atomic_range_compare_add(&rb->prod.head,
                (struct range){ .base = head, .size = avail },
                num);
    }
    while (r.size == 0);
    //Success, copy acquired elements
    for (uint32_t i = 0; i < r.size; i++)
    {
        ev[i] = lookahead[r.base - head + i];
    }
    return r.size;
}
```

FIG. 8 (shown split across FIGS. 8A and 8B but to be read in combination) shows a sequence of steps which are taken according to the method of some embodiments when a slot acquire operation is carried out specifying a requested range (of slots) and a first requested slot with respect to a ring buffer which holds queued data elements. The flow begins at step 150 where this operation starts. Then at step 151 an atomic range-compare-and-add (RCAA) operation is initiated for co-located head and tail pointers of this ring buffer. In other words the values of the head and tail pointers can be derived from a single read operation to a single specified location. It is then determined at step 152 if the difference between the values indicated by the co-located head and tail pointers is non-zero. If it is not, then the flow proceeds to step 153 since no slots are available to be dequeued and the flow concludes. A fresh slot acquire operation beginning at step 150 may follow this modified as required. However, when it is determined at step 152 that slots are in principle available to be acquired, then the flow proceeds to step 154 where it is determined if the head value is less than the first requested slot (specified at step 150 as part of initiating the slot acquire operation) plus the requested range (also specified at step 150 as part of the slot acquire operation). If it is not, i.e. there is no overlap between the head value and the requested range (step 155), then the flow also concludes, since there is no overlap between the requested range and the available slots. Again, from here a fresh slot acquire operation beginning at step 150 may be initiated modified as required. However when this is not the case then from step 156 the flow proceeds to 156 where the requested range is truncated, such that the first requested slot plus the requested range is less than or equal to the tail value determined by the step 151. This limits the range which will be attempted to be acquired to that upper bound of the slot indicated by the tail pointer i.e. for the youngest element in the queue of items in the ring buffer. Then at step 157 an atomic RCAA completes by modifying the head by adding to it the (possibly truncated—see step 156) requested range. Note that where the steps 151 to 157 of FIG. 8 are an implementation of an atomic RCAA operation, all of steps 151, 152, 154, 156, and 157 are performed atomically, i.e. indivisibly—either they all take effect or none take effect. The slot acquire operation then concludes at step 158 where the returned result comprises a pre-modification head value (i.e. that read at step 151) and the (possibly truncated) requested range value by which the head value was modified at step 157.

Returning to a general consideration of the present techniques, the range defined when performing an atomic RCAM operation or an RCAA operation (possibly by execution of a dedicated atomic RCAM or RCAA instruction) can be described by a base and a size. The range may wrap around. In example code this may be presented as:

```
struct range
{
    uint32_t base, size;
};
```

Taking the example of the atomic RCAA operation, this reads a base value from a location in order to compute a fresh range and checks whether the fresh range overlaps with the input range. If overlapping, the location is atomically incremented with the number of allocated elements (which may be less than the number of overlapping elements due to the user request). An example code implementation of this atomic RCAA using exclusives or atomic_compare_exchange( ) is:

```
struct range
atomic_range_compare_add(uint32_t *loc, struct range range, uint32_t requested)
{
    uint32_t base, size;
```

```
#ifndef USE_LDXSTX
    base = __atomic_load_n(loc, __ATOMIC_RELAXED);
#endif
    do
    {
        //Re-read base for fresh value
#ifdef USE_LDXSTX
        base = ldx32(loc, __ATOMIC_RELAXED);
#endif
        //Compute number of elements to skip based on fresh value of base
        int32_t skip = <int32_t>(base - range.base);
        if (skip >= range.size)
        {
            //Ranges do not overlap => no elements within input range eligible
            return (struct range){ .base = base, .size = 0 };
        }
        size = range.size - skip;//Compute fresh range
        size = MIN(size, requested);//Truncate per user request
    }
#ifdef USE_LDXSTX
    while (stx32(loc, base + size, __ATOMIC_RELEASE));
#else
    while (!__atomic_compare_exchange_n(loc,
            &base,//Updated on failure
            base + size,
            1 ,//Weak
            __ATOMIC_RELEASE,
            __ATOMIC_RELAXED));
#endif
    return (struct range){ .base = base, .size = size };
}
```

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 which is the same as the application program interface of the hardware architecture being modelled by the simulator program 310. Thus, the program instructions of the target code 300, including operations to perform the atomic RCAM and RCAA operations as described above, (and further in some embodiments including the proposed novel atomic RCAM and/or RCAA instructions), may be executed from within the instruction execution environment using the simulator program 310, so that a host computer 730 which does not actually have the hardware features of the apparatus 2 discussed above can emulate these features.

In brief overall summary, apparatuses, methods of data processing, complementary instructions and programs related to atomic range-compare-and-modify operations are disclosed. Data processing operations are performed in response to received instructions, wherein the data processing operations comprise an atomic range-compare-and-modify operation, which receives indications of a data value storage location, a range start, and a range size and, as an atomic set of steps, reads a base value stored at the data value storage location, determines an in-range condition to be true when the base value is within a request range having a lower bound being the range start and an upper bound being the range start plus the range size, and when the in-range condition is true, modify the base value to an updated base value. Reduced contention between processes accessing the same data value storage location and range of locations is thus supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
data processing circuitry to perform data processing operations in response to received instructions, wherein the data processing operations comprise an atomic range-compare-and-modify operation, wherein the atomic range-compare-and-modify operation is arranged to:
receive indications of a data value storage location, a range start, and a range size;
and as an atomic set of steps to:
read a base value stored at the data value storage location;
determine an in-range condition to be true when the base value is within a request range having a lower bound being the range start and an upper bound being the range start plus the range size; and,
when the in-range condition is true, modify the base value to an updated base value.

2. The apparatus as claimed in claim 1, wherein the atomic range-compare-and-modify operation is an atomic range-compare-and-add operation, and wherein the atomic range-compare-and-add operation is arranged, when the in-range condition is true, to increase the base value to less than or equal to the upper bound to give the updated base value.

3. The apparatus as claimed in claim 1, wherein the atomic range-compare-and-modify operation is arranged to return the base value as a result of the operation.

4. The apparatus as claimed in claim 1, wherein the atomic range-compare-and-modify operation is arranged to return a size value given by a difference between the base value and the updated base value.

5. The apparatus as claimed in claim 1, wherein the atomic range-compare-and-modify operation is further arranged:
to determine the in-range condition not to be true when the base value less the range start is greater than the range size; and,
when the in-range condition is not true, to generate a failure indication that the atomic range-compare-and-modify operation was not successful.

6. The apparatus as claimed in claim 5, wherein the failure indication comprises returning the base value as a result of the operation.

7. The apparatus as claimed in claim 5, wherein the failure indication comprises returning a zero value size as a result of the operation.

8. The apparatus as claimed in claim 1, wherein the atomic range-compare-and-modify operation is further arranged to receive a requested number of elements, and the atomic set of steps further comprises:
determining a skip value given by the base value less the range start; and,
determining an available range size given by the range size less the skip size, wherein a modification difference between the updated base value and the base value is determined as a smaller value of the available range size and the requested number of elements.

9. The apparatus as claimed in claim 1, further comprising:
storage circuitry to store components of a ring buffer comprising multiple slots to hold queued indications of data items,
wherein the data processing operations performed by the data processing circuitry in response to received instructions comprise a dequeuing operation with respect to the queued indications of data items in the ring buffer,
and wherein the dequeuing operation comprises:
specifying a dequeuing head pointer for the ring buffer to indicate the data value storage location;
specifying as the range size a number of slots for which exclusive access is sought for the dequeuing operation; and,
specifying as the range start a first slot for which exclusive access is sought for the dequeuing operation.

10. The apparatus as claimed in claim 9, wherein the data processing circuitry is arranged to perform a range size truncation comprising:
reading a head value of the dequeuing head pointer for the ring buffer;
reading a tail value of a dequeuing tail pointer for the ring buffer; and,
truncating the range size such that a last slot indicated by the range start plus the range size falls between the head value and the tail value.

11. The apparatus as claimed in claim 10, wherein the data processing circuitry is arranged to perform the range size truncation prior to performing the atomic set of steps.

12. The apparatus as claimed in claim 10, wherein the dequeuing head pointer for the ring buffer is co-located with the dequeuing tail pointer for the ring buffer, and wherein the atomic range-compare-and-modify operation comprises:
receiving a location of the co-located dequeuing head pointer and dequeuing tail pointer as the data value storage location, and wherein the atomic set of steps further comprises performing the range value truncation.

13. The apparatus as claimed in claim 9, wherein the data processing circuitry is arranged, prior to performing the atomic set of steps, to determine a wrap-around condition to be true when the range start plus the range size is greater than a largest value used for enumeration of the multiple slots of the ring buffer, and
when the wrap-around condition is not true, prior to performing the atomic set of steps, to initiate a first read operation with respect to a first slot indicated by the range start followed by a second read operation with respect to a last slot indicated by the range start plus the range size.

14. The apparatus as claimed in claim 13, wherein the data processing circuitry is arranged, when the wrap-around condition is true, prior to performing the atomic set of steps, to initiate a sequence of read operations with respect to a sequence of slots from the first slot to the last slot.

15. The apparatus as claimed in claim 13, wherein the data processing circuitry is arranged, when the wrap-around condition is true, prior to performing the atomic set of steps, to initiate a first read operation with respect to a first slot indicated by the range start followed by a second read operation with respect to a last slot indicated by the range start plus the range size.

16. A data processing method comprising:
performing data processing operations m response to received instructions, wherein the data processing operations comprise an atomic range-compare-and-modify operation, wherein the atomic range-compare-and-modify operation is arranged to:
receive indications of a data value storage location, a range start, and a range size;
and as an atomic set of steps to:
read a base value stored at the data value storage location;
determine an in-range condition to be true when the base value is within a request range having a lower-bound being the range start and an upper-bound being the range start plus the range size; and,
when the in-range condition is true, to modify the base value to an updated base value.

17. A data processing apparatus comprising:
instruction decoder circuitry to decode instructions and to generate control signals dependent on the instructions; and
data processing circuitry to perform data processing operations in response to the control signals,
wherein the instruction decoder circuitry is responsive to an atomic range-compare-and-modify instruction providing indications of a data value storage location, a range start, and a range size to generate the control signals such that the data processing circuitry performs an atomic range-compare-and-modify operation comprising, as an atomic set of steps:
reading a base value stored at the data value storage location;
determining an in-range condition to be true when the base value is within a request range having a lower-bound being the range start and an upper-bound being the range start plus the range size; and,
when the in-range condition is true, modifying the base value to an updated base value.

18. A method of data processing comprising:
decoding instructions and generating control signals dependent on the instructions; and,
performing data processing operations in response to the control signals,
wherein the decoding instructions comprises, in responsive to an atomic range-compare-and-modify instruction providing indications of a data value storage location, a range start, and a range size generating the control signals such that the data processing circuitry performs an atomic range-compare-and-modify operation comprising, as an atomic set of steps:
reading a base value stored at the data value storage location;
determining an in-range condition to be true when the base value is within a request range having a lower-bound being the range start and an upper-bound being the range start plus the range size; and,
when the in-range condition is true, modifying the base value to an updated base value.

19. A computer program for controlling a host data processing apparatus to provide an instruction execution environment comprising:
instruction decoder logic to decode instructions and to generate control signals dependent on the instructions; and,
data processing logic to perform data processing operations in response to the control signals,
wherein the instruction decoder logic is responsive to an atomic range-compare-and-modify instruction providing indications of a data value storage location, a range start, and a range size generating the control signals such that the data processing logic performs an atomic range-compare-and-modify operation comprising, as an atomic set of steps:
reading a base value stored at the data value storage location;
determining an in-range condition to be true when the base value is within a request range having a lower-bound being the range start and an upper-bound being the range start plus the range size; and,
when the in-range condition is true, modifying the base value to an updated base value.

* * * * *